United States Patent [19]

Müller et al.

[11] Patent Number: 4,508,955

[45] Date of Patent: Apr. 2, 1985

[54] ELECTRODE FOR THE TIG WELDING PROCESS

[75] Inventors: Michael Müller, Munich; Dietmar Mautner, Herbertshausen, both of Fed. Rep. of Germany

[73] Assignee: Motoren Turbinen-Union Munchen GmbH, Munich, Fed. Rep. of Germany

[21] Appl. No.: 588,732

[22] Filed: Mar. 12, 1984

[30] Foreign Application Priority Data

Mar. 14, 1983 [DE] Fed. Rep. of Germany ....... 3309069

[51] Int. Cl.$^3$ ............................................. B23K 35/00
[52] U.S. Cl. ........................... 219/146.21; 219/146.31
[58] Field of Search ........... 219/146.1, 146.21, 146.31, 219/75

[56] References Cited

U.S. PATENT DOCUMENTS 3,639,161 2/1972 Trattner et al. .......... 219/146.21 X
3,976,853 8/1976 Trattner et al. ................ 219/75 X Primary Examiner—Roy N. Envall, Jr.
Assistant Examiner—C. M. Sigda
Attorney, Agent, or Firm—Posnack, Roberts, Cohen & Spiecens

[57] ABSTRACT

An electrode suitable for the TIG welding process, in which the welding arc produced by contact-less ignition between the tip of the electrode and the workpiece burns within an inert gas atmosphere and the application of the weld material is effected by a separately guided welding rod. In order to optimize the startability, the tungsten electrode has a thorium oxide content of 2–4% and a thorium-oxide particle size of 6–12 μm.

3 Claims, 2 Drawing Figures

ELECTRODE FOR THE TIG WELDING PROCESS

FIELD OF THE INVENTION

The invention relates to an electrode for a TIG welding process, in which a welding arc is produced by contact-less ignition between a tip of the electrode and the workpiece within an atmosphere of an inert gas and welding material is supplied from a separately guided welding rod.

BACKGROUND AND PRIOR ART

In many fields of the metalworking industry, welding is carried out by the TIG Process (tungsten,inert-gas process). The tungsten electrodes used in this process as the carrier of the welding arc are doped with oxidic additives generally thorium oxide, in order to improve their ignition properties.

The startability of the electrodes presently in use decreases substantially as the number of starts increases. Contact-free ignition is, in most cases, no longer possible after only about ten restarts with merely brief disconnection of the current, about 10 seconds after the termination of the flow of the inert gas. Due to the short lives of these electrodes the cost of the finished products is greatly increased.

SUMMARY OF THE INVENTION

An object of the invention is to eliminate these disadvantages of the electrodes which have been previously used and to provide an electrode which is characterized by optimum ignition properties upon contact-less ignition and at the same time assures comparatively long life and continuous loads.

In particular, within the scope of the TIG welding process, the electrode should furthermore in accordance with its purpose, permit the production of an extremely rapidly producible, stable "clean" arc which does not lead to any substantial change in the surface of the tips of the electrodes which would be disadvantageous for startability.

This object is achieved in accordance with the invention by providing the thorium oxide in an amount of 2-4% and a particle size of 6-12 $\mu$m (1 $\mu$m=0,001 mm).

As a result, there is obtained a comparatively coarse distribution of $ThO_2$ with a comparatively wide line pattern of the tungsten-$ThO_2$ structure. Depending on the use of the electrode, both unannealed as well as annealed and thus recrystallized electrodes (2200° C./hour) can be used and thus, in each of these cases of use, an optimally startable electrode is obtained whose startability is 10-20 times greater than that of previously known electrodes.

In contrast with previous unsuccessful efforts over a period of decades to arrive at improved starting characteristics by a uniform, fine distribution of the $ThO_2$ ($ThO_2$ content up to 4%, $ThO_2$ particle size of 0.5 to 5 $\mu$m), success has been obtained as a result of a daring step taken by the inventors, by the use of an exactly opposite philosophy of providing a coarsened Wolfram-$ThO_2$ structure.

DETAILED DESCRIPTION OF A PREFERRED EMBODIMENT

Figure 1:
FIG. 1 is a photographic reproduction enlarged 200 times of a tungsten electrode according to the prior art.

Referring to FIG. 1 which shows a photographic reproduction of 200 times enlargement of the structure of the material of a conventional tungsten electrode with a comparatively fine $ThO_2$ distribution with a $ThO_2$ content of 3% and thus, consistent therewith, a relatively narrow line pattern of the structure, the $ThO_2$ is shown as dark spots on the structure.

Figure 2:
FIG. 2 is a photographic reproduction enlarged 200 times of a tungsten electrode according to the invention.

FIG. 2 shows, in contradistinction to this, the structure of the electrode material in accordance with the invention which shows a coarse distribution of the $ThO_2$ which leads to the decisive success as compared with the prior art. The structure in FIG. 2 is based on a thorium oxide content for the tungsten electrode of 4% and a $ThO_2$ particle size of up to 12 $\mu$m.

In principle, it should be pointed out in this connection that, for a $ThO_2$ content of 2-4%, the startability increases with increasing particle size within the range of 6-12 $\mu$m.

By the use of the electrode in accordance with the invention, comparatively uncomplicated TIG welding apparatus can be used, which therefore does not require any special electronic equipment in order to achieve improved startability.

What is claimed is:

1. An electrode for a TIG welding process, in which a welding arc is produced by contact-less ignition between a tip of the electrode and the workpiece within an atmosphere of an inert gas and welding material is supplied from a separately guided welding rod, said electrode consisting of tungsten with thorium-oxide, the thorium oxide being present in an amount of 2-4% and a particle size of 6-12 $\mu$m.

2. An electrode as claimed in claim 1 wherein the thorium oxide is provided in a relatively coarse distribution in the tungsten and a relatively wide line pattern of the tungsten-thorium oxide structure is formed.

3. A method of providing a contact-less electrode composed of tungsten and thorium oxide with the property of contact-free ignition after a multitude of starts, said method comprising providing the tungsten electrode with thorium oxide in an amount of 2-4% and a particle size of 6-12 $\mu$m.

* * * * *